Nov. 15, 1955

J. P. HAWORTH 2,723,508

FISH HOOK SHARPENER

Filed Nov. 9, 1953

*INVENTOR.*
JAMES P. HAWORTH

BY  *Knox & Knox*

ATTORNEY IN FACT
FOR APPLICANT

United States Patent Office 2,723,508
Patented Nov. 15, 1955

2,723,508

FISH HOOK SHARPENER

James P. Haworth, San Diego, Calif.

Application November 9, 1953, Serial No. 390,787

5 Claims. (Cl. 51—204)

The present invention relates generally to abrasive sharpening devices and more particularly to a fish hook sharpener.

The primary object of this invention is to provide a fish hook sharpener which is simple and handy to use under any conditions, so that one can recondition a hook of any size quickly and easily at any time. To accomplish this, there is provided an abrasive stick containing both fine and coarse abrasives, and a slidable, rotatable sleeve having means for holding the hooks in the correct position against the abrasive.

Another object of this invention is to provide a fish hook sharpener in which the abrasive stick has a full length central bore to facilitate sharpening all sides of the barb portions of fish hooks. Due to the full length bore, the entire length of the abrasive stick is usable even when broken off or worn away, and the loosened particles of abrasive and metal are allowed to escape automatically.

Another object of this invention is to provide a fish hook sharpener in which the abrasive stick has protective collars set into the ends of the central bore to prevent inadvertent grinding of the shank portions of fish hooks.

Another object of this invention is to provide a fish hook sharpener which is adapted for fabrication from many different materials, so that the choice of material can be according to the dictates of availability and price considerations, the exact sizes and proportions being matters easily determined to suit particular conditions and needs.

Another object of this invention is to provide a fish hook sharpener which is inexpensive and practicable to manufacture.

Finally, it is an object to provide a fish hook sharpener of the aforementioned character which is simple, safe and convenient to operate, and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawing which forms a material part of this disclosure and wherein similar characters of reference indicate similar or identical elements and portions throughout the specification and throughout the views of the drawing, and in which:

Figure 1:
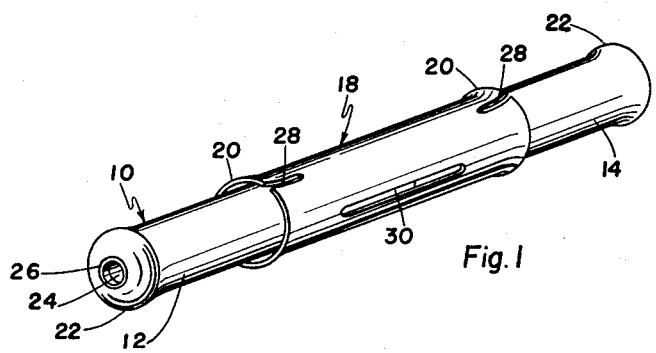
Fig. 1 is a perspective view of the fish hook sharpener.
Figure 2:
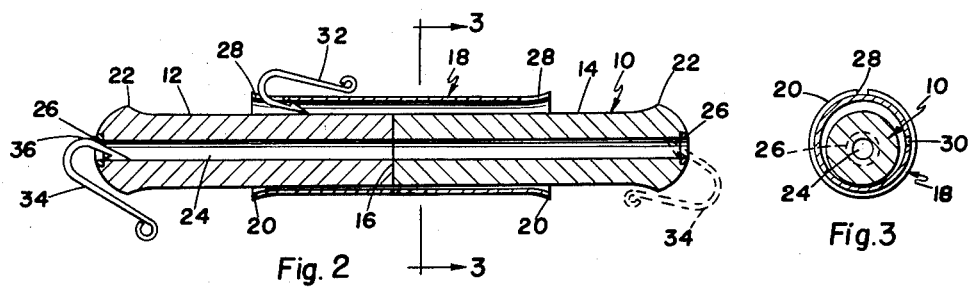
Fig. 2 is a longitudinal sectional view of the device.
Figure 3:
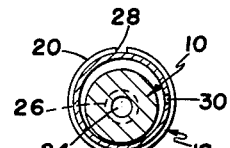
Fig. 3 is a sectional view taken on the line 3—3 of Fig. 2.

Referring now to the drawing and in particular to Figs. 1–3, the device includes an abrasive stick 10 which comprises a fine abrasive portion 12 and a coarse abrasive portion 14 cemented or suitably joined together at 16. Surrounding the abrasive stick 10 is a slidable and rotatable sleeve 18 having flared ends 20. The abrasive stick 10 also has flared ends 22 which serve as stops to retain the sleeve 18 thereon. The abrasive stick 10 is provided with an axial bore 24, at each end of which is embedded a metallic collar 26. The inside diameter of each collar 26 is identical to that of the bore 24. The sleeve 18 has at each end a notch 28 and is also provided with a longitudinal slot 30.

Fish hooks may be sharpened in various ways as shown in Fig. 2. The fish hook 32 is shown engaged in one of the notches 28, the point of the hook being held slightly inclined to the abrasive stick 10. By rotating or reciprocating the abrasive stick axially in the sleeve 18, the hook 32 is ground to a sharp point, the notch 28 holding the hook against rotation with the abrasive stick. Alternatively, a hook may be inserted through the slot 30 and held while the abrasive stick is rotated.

In order to sharpen the inside of the barb portion, the fish hook 34 is shown inserted into the end of the bore 24 with the barb against the inner abrasive surface. The shank portion 36 of the hook 34 is held against the collar 26 to retain the barb in contact with the abrasive surface, said collar preventing the shank from being cut or damaged by the abrasive when the abrasive stick 10 is rotated. The abrasive stick may, of course, be applied to any portion of the fish hooks to remove slight burrs or the like. Many types and sizes of fish hooks may be sharpened with the device, the two grades of abrasive enabling the user to sharpen points quickly with the coarse portion 14 and then finish the points with the fine portion 12.

Figure 4:
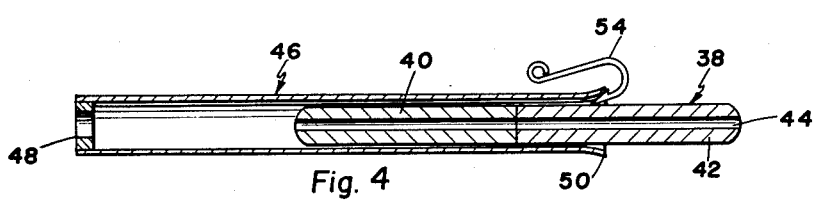
Fig. 4 is a longitudinal sectional view of a modified form of the device in operating positon.
Figure 5:
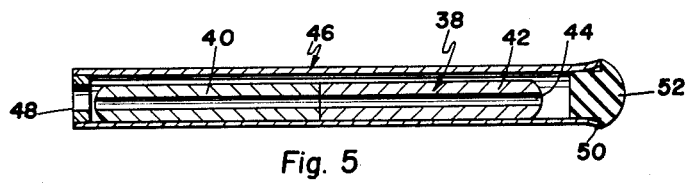
Fig. 5 is a longitudinal sectional view similar to Fig. 4 but showing the device in closed position.

A modified form of the invention is illustrated in Figs. 4 and 5, this particular form including an abrasive stick 38, composed of a fine abrasive portion 40 and a coarse abrasive portion 42 as previously described. The abrasive stick 38 also has an axial bore 44 but the ends thereof are substantially plain.

The abrasive stick 38 is rotatable and axially slidable in a sleeve 46, said sleeve being partially closed at one end by a retaining ring 48. The open end of the sleeve 46 is flared as indicated at 50 and is fitted with a removable plug 52 of rubber or the like, as shown in Fig. 5, to retain the abrasive stick 38 when not in use.

In order to sharpen a fish hook, the plug 52 is removed and the abrasive stick 38 is partially withdrawn as shown in Fig. 4. The fish hook 54 is inserted between the sleeve 46 and the abrasive stick 38, the flared end 50 serving to hold the hook at the required sharpening angle. The hook may also be sharpened in the bore 44 as previously described. The opening of the retaining ring 48 allows surplus abrasive and metal particles, as well as any trapped water, to escape from the sleeve, so preventing jamming of the stick 10 in the sleeve 18 and avoiding soiling of clothing when the device is carried in a pocket.

The full length axial bore in the abrasive stick allows abrasive and metal particles to fall clear, thus preventing clogging of the bore.

Figure 6:
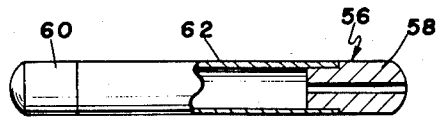
Fig. 6 is a side elevation view, partially sectioned, of a further modified form of the device.

Another slightly modified form of my invention is illustrated in Fig. 6, wherein the abrasive stick 56 is formed in two parts, 58 and 60, one a coarser abrasive than the other, rigidly fixed, ordinarily by cementing, in the ends of a section of metal or plastic tube 62. The modified stick 56 is used exactly as the first described stick 10.

The operation of this invention will be clearly comprehended from a consideration of the foregoing description of the mechanical details thereof, taken in connection with the drawing and the above recited objects. It will be obvious that all said objects are amply achieved by this invention.

Further description would appear to be unnecessary.

It is understood that minor variation from the form of the invention disclosed herein may be made without departure from the spirit and scope of the invention and that the specification and drawing are to be considered as merely illustrative rather than limiting.

I claim:

1. A fish hook sharpener comprising an abrasive stick having fine and coarse abrasive portions, an axial bore in said abrasive stick to permit insertion of a fish hook point and to allow escape of loosened particles of abrasive and metal, and a sleeve, said abrasive stick being rotatable and slidable in said sleeve, said sleeve having a flared end portion, and said flared end having hook-receiving notches.

2. A fish hook sharpener comprising an abrasive stick having fine and coarse abrasive portions, an axial bore in said abrasive stick, a sleeve, said abrasive stick being rotatable and slidable in said sleeve, and said sleeve having flared ends, said flared ends having hook-receiving notches, said abrasive stick having enlarged end portions of greater transverse dimension than the inside diameter of said sleeve.

3. A fish hook sharpener comprising an abrasive stick having fine and coarse abrasive portions, an axial bore in said abrasive stick, a sleeve, said abrasive stick being rotatable and slidable in said sleeve, and said sleeve having flared ends, said flared ends having hook-receiving notches, said sleeve having a longitudinal slot therein, said abrasive stick having enlarged end portions of greater transverse dimension than the inside diameter of said sleeve.

4. A fish hook sharpener comprising an abrasive stick having fine and coarse abrasive portions, an axial bore in said abrasive stick, non-abrasive collars embedded in said abrasive stick at the ends of said bore, the inside diameter of said bore and said collars being constant.

5. A fish hook sharpener comprising an abrasive stick having fine and coarse abrasive portions, an axial bore in said abrasive stick to permit insertion of a fish hook point and to allow escape of loosened particles of abrasive and metal, non-abrasive collars embedded in said abrasive stick at the ends of said bore, the inside diameter of said bore and said collars being constant, a sleeve, said abrasive stick being rotatable and slidable in said sleeve, and said sleeve having flared ends, said flared ends having hook-receiving notches, said sleeve having a longitudinal slot therein, said abrasive stick having enlarged end portions of greater transverse dimension than the inside diameter of said sleeve.

References Cited in the file of this patent

UNITED STATES PATENTS

| | | |
|---|---|---|
| 551,673 | Greene | Dec. 17, 1895 |
| 880,153 | Moorman | Feb. 25, 1908 |
| 1,006,000 | Oosdyke | Oct. 17, 1911 |
| 1,520,488 | Tone | Dec. 23, 1924 |
| 1,848,182 | Koebel | Mar. 8, 1932 |
| 2,092,831 | Cannon | Sept. 14, 1937 |
| 2,426,892 | Mayer | Sept. 2, 1947 |

FOREIGN PATENTS

| | | |
|---|---|---|
| 464,775 | France | Jan. 21, 1914 |